US008488178B2

(12) United States Patent
Fukata

(10) Patent No.: US 8,488,178 B2
(45) Date of Patent: Jul. 16, 2013

(54) IMAGE FORMING APPARATUS STORAGE FILES WITH FILE ATTRIBUTION TABLE HAVING DELETION DATE AND FLAG

(75) Inventor: Takuya Fukata, Chuo-ku (JP)

(73) Assignee: Kyocera Document Solutions Inc., Osaka (JP)

( * ) Notice: Subject to any disclaimer, the term of this patent is extended or adjusted under 35 U.S.C. 154(b) by 1788 days.

(21) Appl. No.: 11/766,519

(22) Filed: Jun. 21, 2007

(65) Prior Publication Data
US 2008/0016090 A1 Jan. 17, 2008

(30) Foreign Application Priority Data

Jun. 21, 2006 (JP) ................................ 2006-171041
Jun. 21, 2006 (JP) ................................ 2006-171042

(51) Int. Cl.
*G06F 15/00* (2006.01)

(52) U.S. Cl.
USPC .............. 358/1.16; 348/333.05; 707/999.007; 707/999.204

(58) Field of Classification Search
USPC .............. 348/333.05; 358/1.16; 707/999.007, 707/999.204
See application file for complete search history.

(56) References Cited

U.S. PATENT DOCUMENTS

| 5,926,821 | A | * | 7/1999 | Hirose et al. ................... 707/202 |
| 6,775,665 | B1 | * | 8/2004 | Piersol ................................. 1/1 |
| 7,027,171 | B1 | * | 4/2006 | Watanabe ..................... 358/1.15 |
| 7,345,777 | B2 | * | 3/2008 | Lester et al. ................. 358/1.14 |
| 2003/0151768 | A1 | * | 8/2003 | Iida ............................... 358/1.15 |
| 2004/0184072 | A1 | * | 9/2004 | Jacobsen et al. ............. 358/1.15 |

FOREIGN PATENT DOCUMENTS

| JP | 2003276272 | 9/2003 |
| JP | 2004199456 | 7/2004 |

* cited by examiner

*Primary Examiner* — Peter K Huntsinger
(74) *Attorney, Agent, or Firm* — Browdy and Neimark, PLLC

(57) ABSTRACT

Responding to an instruction accompanied with data having a folder path and a saving period from a computer, a record having the data is added to a saving period table. Responding to an instruction accompanied with a document file and a folder path from the computer, a file registration process is executed wherein a record is added to a file attribution table, the record having a document file path, a total number of pages, a data size, a file registration date, and a scheduled date of file deletion; the document file is stored in the folder; and a thumbnail of the first page of the file is created. Responding to a view instruction from the computer, an HTML file is created by relating records in the file attribution table with respective thumbnails to send it to the computer. Document files whose saving periods have ended are automatically deleted.

9 Claims, 9 Drawing Sheets

FIG.2

FOLDER PATH ./IP/Patent

| NAME | DATE&TIME | SIZE | PAGES | DATE TO BE DELETE ▼

JPA_▲▲1.PDF
REGISTRATION
2006/02/01 10:05
SIZE   110 KB
PAGES   8 P
DATE TO BE
DELETED
2006/05/01

JPA_▲▲2.PDF
REGISTRATION
2006/02/02 14:32
SIZE   112 KB
PAGES   13 P
DATE TO BE
DELETED
2006/05/02

JPA_▲▲3.PDF
REGISTRATION
2006/02/28 08:43
SIZE   299 KB
PAGES   32 P
DATE TO BE
DELETED
2006/05/28

JPA_▲▲4.PDF
REGISTRATION
2006/03/10 19:16
SIZE   249 KB
PAGES   27 P
DATE TO BE
DELETED
2006/06/07

JPA_▲▲5.PDF
REGISTRATION
2006/04/09 13:00
SIZE   128 KB
PAGES   11 P
DATE TO BE
DELETED
2006/07/07

JPA_▲▲6.PDF
REGISTRATION
2006/05/12 18:22
SIZE   95 KB
PAGES   11 P
DATE TO BE
DELETED
2006/08/09

Previous  1  2  3  4  5  6  Next     DEL     PRNT

FIG.3A  FILE ATTRIBUTION TABLE

| FILE PATH | REGISTRATION | SIZE (MB) | PAGES | (SCHEDULED)DEL | DLTED |
|---|---|---|---|---|---|
| /Develop1/KM-C830/Manual.pdf | 2005/01/04 10:12 | 11.032 | 52 | 0 | No |
| /Develop1/KM-C830/Sekkei.pdf | 2005/05/03 13:39 | 9.526 | 37 | 0 | No |
| ... | ... | ... | ... | ... | ... |
| /Develop1/Kikaku/Presen1.pdf | 2005/12/19 23:30 | 2.128 | 10 | 2006/01/17 | Yes |
| ... | ... | ... | ... | ... | ... |
| /IP/Patent/JPA_▲▲1.pdf | 2006/02/01 10:05 | 0.110 | 88 | 2006/05/01 | No |
| ... | ... | ... | ... | ... | ... |

FIG.3B  SAVING PERIOD TABLE

| FOLDER PATH | SVNG PRD (DAY) |
|---|---|
| /Develop1/KM-C830 | 0 |
| /Develop1/Kikaku | 30 |
| /IP/Patent | 90 |
| /Sale/Meibo | 0 |
| ... | ... |

IMAGE FORMING APPARATUS STORAGE FILES WITH FILE ATTRIBUTION TABLE HAVING DELETION DATE AND FLAG

CROSS-REFERENCE TO RELATED APPLICATIONS

This application is based upon and claims the benefit of priority from the prior Japanese Patent Application No. 2006-171041 and 2006-171042, each filed on Jun. 21, 2006, the entire contents of which are incorporated herein by reference.

TECHNICAL FIELD

The invention relates to an image forming apparatus having a printing function and an auxiliary storage, and more specifically to an image forming apparatus having functions to store files onto an auxiliary storage, view files in the auxiliary storage, and delete files in the auxiliary storage.

BACKGROUND OF THE INVENTION

There are sold image forming apparatuses, especially multifunction machines, having a hard disk that a user can store files thereon to print out its contents when necessary.

In a case where a hard disk of such image forming apparatus is communal to many users, unnecessary files in the hard disk need to be deleted to avoid insufficiency in capacity.

JP No. 2004-199456-A discloses a configuration wherein a user schedules a date of file deletion when storing the file on a hard disk, and an email is sent to the user, when the set date of deletion is nearby, to inform the user of the date of deletion.

This configuration allows for extending a date of deletion if a user wants to extend it even if the user has forgotten the date of deletion.

Also, JP No. 2003-276272-A, discloses a configuration wherein an image forming apparatus displays a thumbnail of a document.

This configuration allows for easy verification of contents of a print target document before printing.

However, in a case of the above-mentioned JP No. 2004-199450-A, it can be bothersome for a user to set a date of deletion for each file. Furthermore, there can be left a lot of files without a date of deletion scheduled, because a user forgot to or because it is bothersome for a user to, frequently resulting in insufficiency in capacity of a hard disk or hindrance to an easy selection of necessary files. In addition, checking and deleting many unnecessary files will take a long time.

The invention of the above-mentioned JP No. 2003-276272-A is for the purpose of checking only one print target, when a memory card is inserted into an image forming apparatus, by displaying a thumbnail of a document stored in the memory card on a display panel of the image forming apparatus, but not for the purpose of readily and quickly checking and deleting many files on a hard disk in an image forming apparatus.

SUMMARY OF THE INVENTION

Accordingly, it is an object of the present invention to provide an image forming apparatus having an auxiliary storage capable of easy and quick verification and deletion of unnecessary files stored in the auxiliary storage.

Another object of the present invention is to provide an image forming apparatus having an auxiliary storage capable of easy scheduling of a date of file deletion.

In a first aspect of the present invention, a file registration program and a fie view program are stored in program storing means, wherein the file registration program orders a processor: in response to receipt of a file registration instruction, a file, and a folder path through a communication interface, to add a record having a path of the file and a registration date of the file into an auxiliary storage to a file attribution table, to store the file into a folder of the auxiliary storage, and to create a thumbnail of a specified pace of the file to store the thumbnail into the auxiliary storage, wherein the file view program orders the processor:

in response to receipt of a view instruction from an inputting means or the communication interface, (a) to create a display data relating file names and registration dates of respective files in the file attribution table with respective thumbnails, and to provide the display data to a display means or through the communication interface to a host computer;

in response to receipt of a sort instruction and data indicating a sort item in the file attribution table and indicating either an ascending or descending order from the inputting means or through the communication interface, to sort records in the file attribution table, and to execute the processing of (a); and in response to a file deletion instruction and deletion file identifying data from the inputting means or through the communication interface, to delete files identified by the deletion file identifying data from the auxiliary storage, to delete records corresponding to the deletion file identifying data from the file attribution table, and to execute the processing of (a).

This configuration has an advantage in that confirming and deleting files can be readily and quickly executed even if a lot of unnecessary files are stored in the auxiliary storage.

In a second aspect of the present invention, a saving period setting program, a file registration program, and an automatic file deletion program are stored in program storing means, wherein the saving period setting program orders a processor: in response to receipt of a saving period registration instruction, a folder path, and data indicating a saving period from an inputting means or through a communication interface, to add a record having the folder path and a value relating to the data to a saving period table, wherein the file registration program orders the processor: in response to receipt of a file registration instruction, a file, and a folder path from the inputting means or through the communication interface, to add a record having a path of the file and a registration date of the file in an auxiliary storage to a file attribution table, and to store the file into the folder of the auxiliary storage, wherein the automatic file deletion program orders the processor: to refer to the saving period table, the file attribution table, and a current date to delete a file whose saving period has passed the current date from the folder and to delete a record corresponding to this file from the file attribution table.

This configuration has an advantage in that an appropriate date of deletion can be easily scheduled for each file, because a date of file deletion is automatically scheduled according to a user's indication of with folder to store a file, by assigning a saving period to the folder in advance.

In a third aspect of the present invention, a saving period setting program, a file registration program, and an automatic file deletion program are stored in storing means, wherein the saving period setting program orders a processor: in response to receipt of a saving period registration instruction, a folder path, and data indicating a saving period from an inputting means or through a communication interface, to add a record having the folder path and a value relating to the data to a saving period table, wherein the file registration program orders the processor: in response to receipt of a file registration instruction, a file, and a folder path from the inputting means or through the communication interface, to add a record having a path of the file, a registration date of the file in the auxiliary storage, and a scheduled date of file deletion determined by referring the saving period table to a file attribution table, and to store the file into the folder of the auxiliary storage, wherein the automatic file deletion program orders the processor: to refer to the file attribution table and a current date to delete a file whose saving period has passed the current date from the folder, and to delete a record corresponding to this file from the file attribution table.

This configuration has an advantage similar to the advantage of the above-mentioned second aspect of the present invention. In addition, there is an advantage in that the configuration can be simplified because the automatic file deletion program does not require a reference to the saving period table.

Other aspects, objects, and advantages of the present invention will become apparent from the following detailed description taken in connection with the accompanying drawings.

BRIEF DESCRIPTION OF THE DRAWING

FIG. 2 is an illustration of a content display screen displayed by a browser in a host computer;

FIGS. 3A and 3B are illustrations of a file attribution table and a saving period table, respectively;

DESCRIPTION OF THE PREFERRED EMBODIMENT

Figure 1:
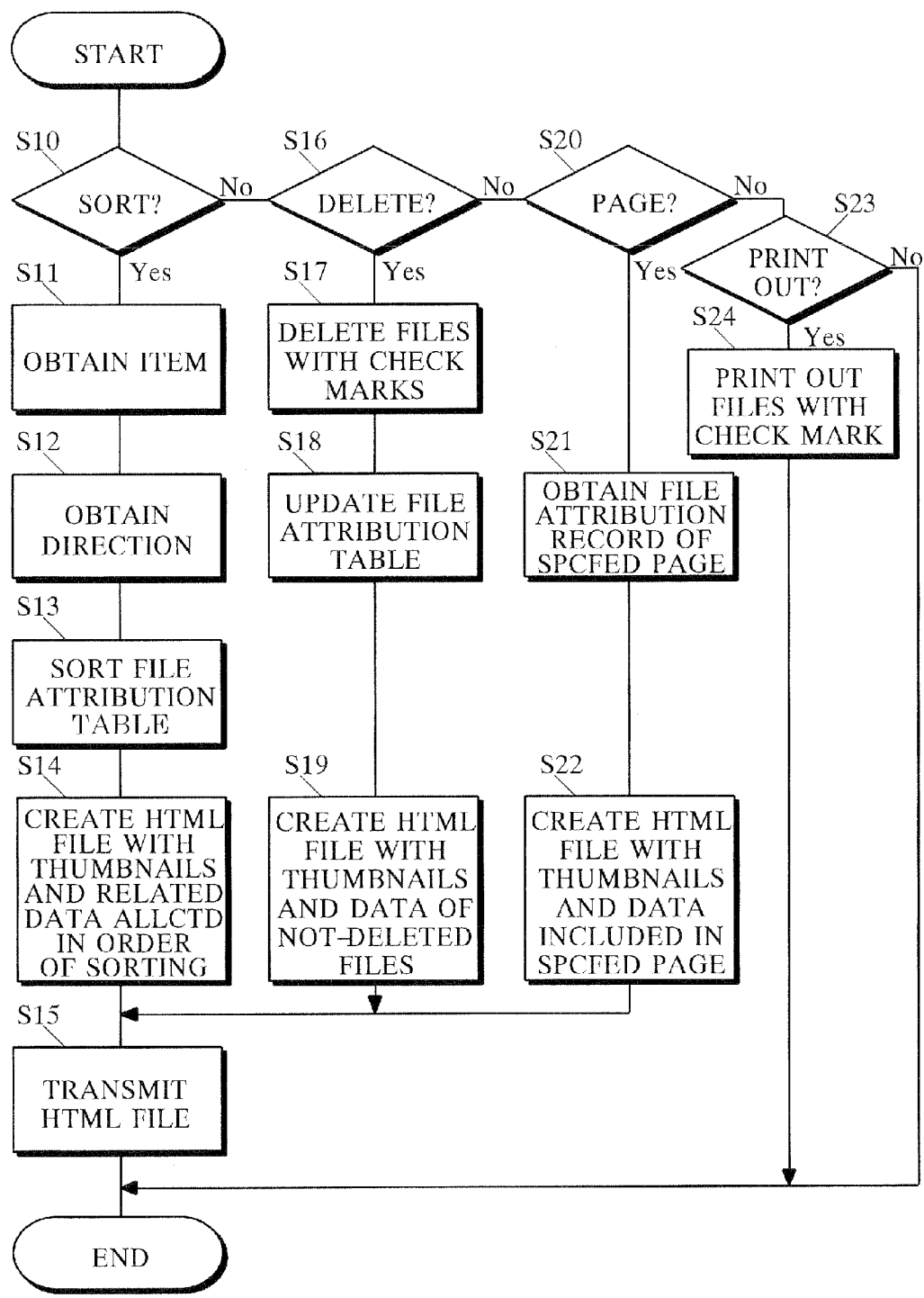
FIG. 1 is a flowchart of processing by an event handler on a side of an image forming apparatus incurred by pressing of a selected item, a delete button, page designation, or a print button displayed by a browser in a host computer.

Referring now to the drawings, wherein like reference characters designate like or corresponding parts throughout several views, preferred embodiment of the present invention will be described below.

Figure 9:
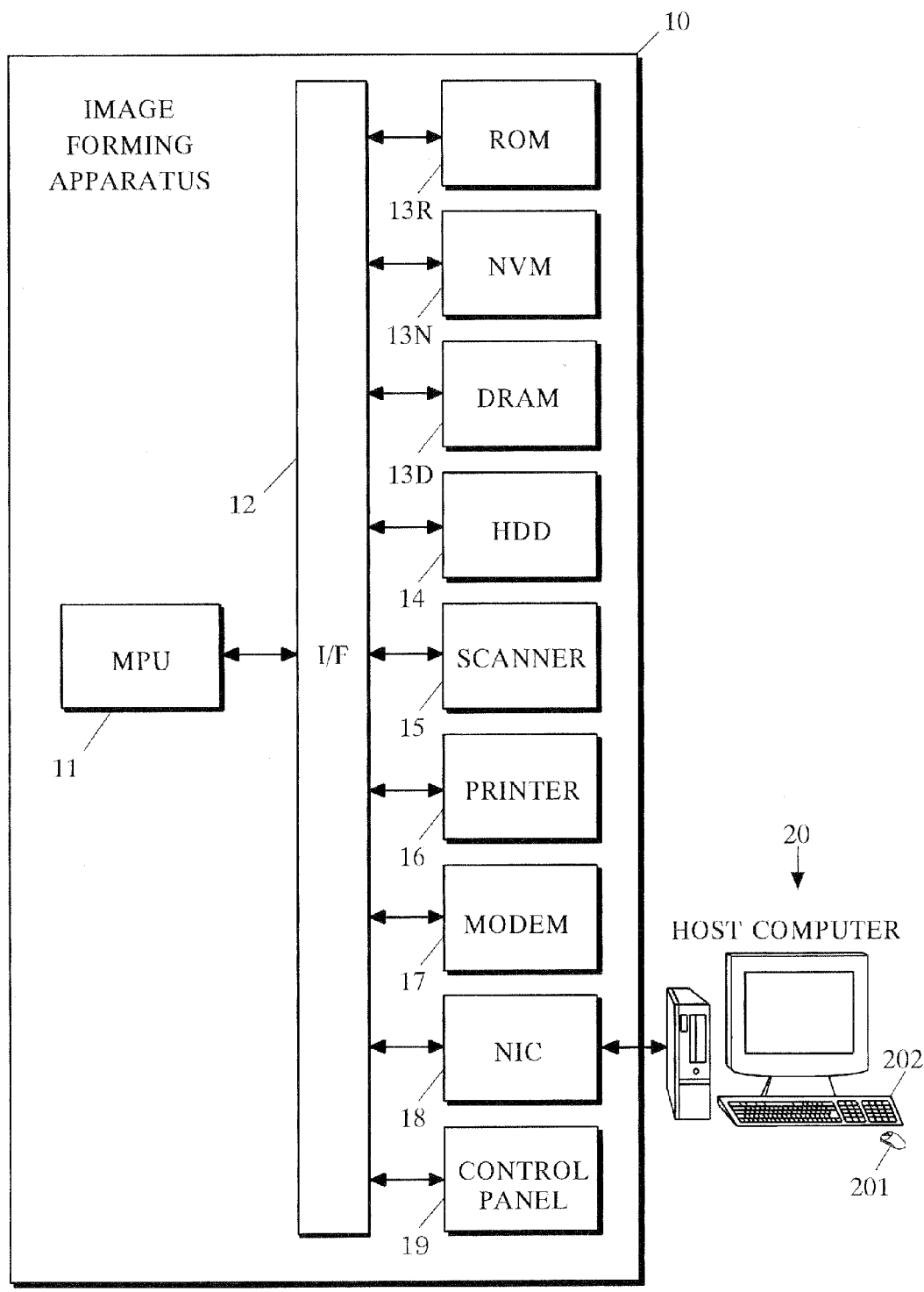
FIG. 9 is a schematic block diagram of a hardware configuration of the image forming apparatus.

FIG. 9 is a schematic block diagram showing a hardware configuration of an image forming apparatus of one embodiment according to the present invention.

In this image forming apparatus 10, an MPU (micro-processing unit) 11 is connected via an interface 12 to a ROM 13R, an N (nonvolatile memory) 13N, a DRAM (dynamic random access memory) 13D, a hard disk 14, a scanner 15, a printer 16, a modem 17, a NIC (network interface card) 18, and a control panel 19. For sake of simplification, plural interfaces are illustrated as a single block in FIG. 9.

In the ROM 13R, a boot strap and BIOS are stored. In the NVM 13N such as a flash memory, various settings are stored. The DRAM 13D is for a main memory. In the hard disk 14, an operating system (OS), an application operating on the OS, a web server, web applications, a database management system (DBMS), and various device drivers operating under the OS, and data files including a database are stored. The application includes a program that directs the image forming apparatus 10 to function as a multifunction machine, functions of which include copying, scanning, printing, and faxing. The application also includes a program to view, delete, and print a document file stored in the hard disk 14 using a host computer 20 via the NIC 18, and a program on a side of the image forming apparatus 10 to store a file on a side of the host computer 20 onto the hard disk 14 in the image forming apparatus 10.

The scanner 15 is for inputting images in copying and facsimile transmittance. The printer 16 has a print engine, a fixing device, a paper feeder, a paper carrier, and a paper discharger. Based on bit map data provided as printing data, the printer 16 forms an electrostatic latent image on a photoconductor drum of the print engine, develops the electrostatic latent image with toner, transfers and fixes the toner image onto a paper, and discharges the paper. The modem 17 is for sending and receiving facsimiles. The NIC 18 is coupled to the host computer 20 on a network, and is used for accessing files of print jobs and the hard disk 14. The control panel 19 is for inputting settings or commands and displaying, for example, settings and a status.

Figure 8:
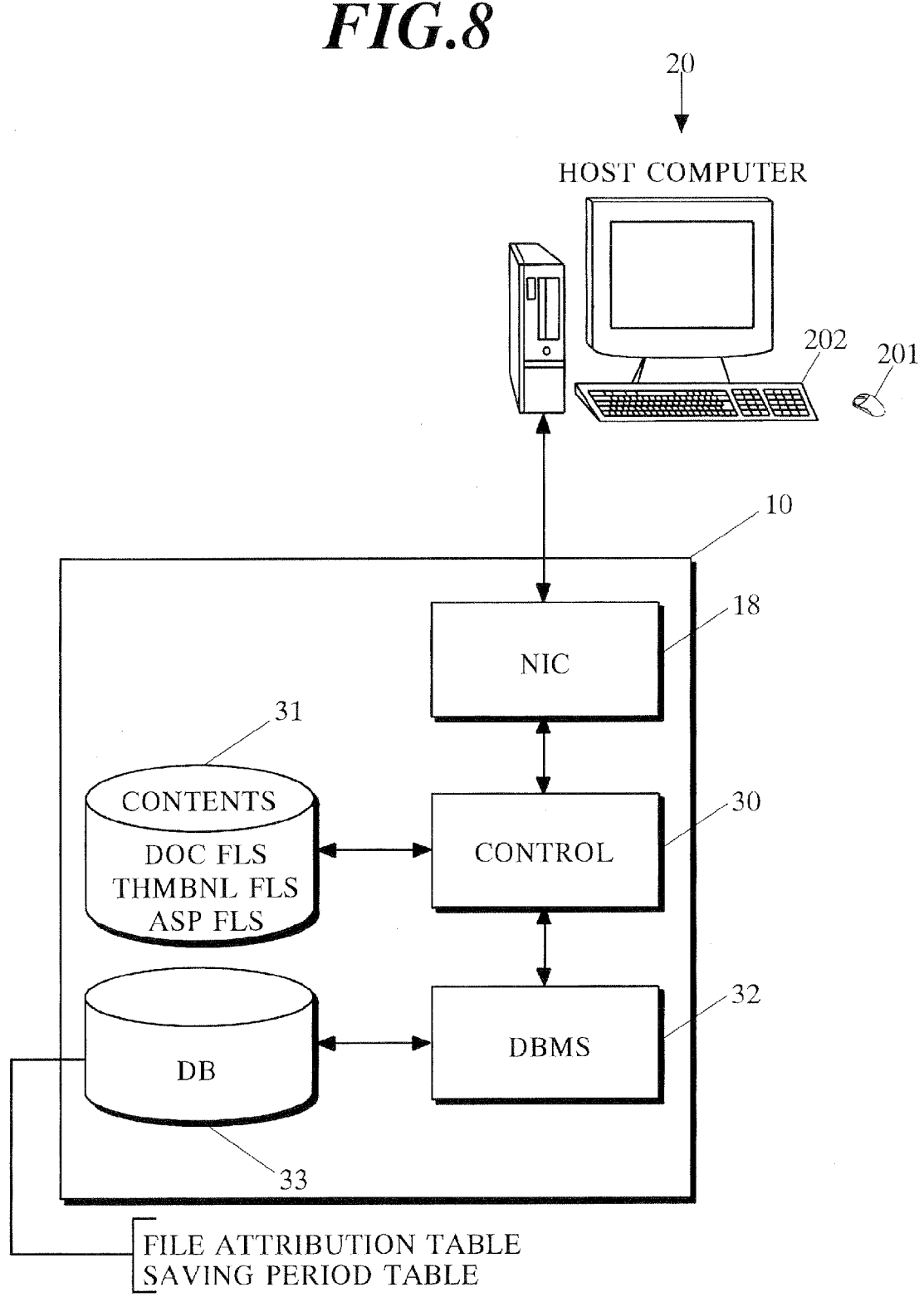
FIG. 8 is a schematic block diagram associated with a server function of one embodiment according to the present invention.

FIG. 8 is a schematic block diagram associated with a server function of the image forming apparatus 10.

A control section 30 of the image forming apparatus 10 is equipped with an OS, a web server (program) and a web application server (program) operating on the OS.

If an request from the host computer 20 is provided via the NIC 18 to the control section 30 of the image forming apparatus 10, the control section 30, in response to this, performs a process such as one described below, following a program included in an ASP (Active Server Pages) file in contents 31. That is, the control section 30 accesses a database 33 via a DBMS 32, creates an HTML files by merging data obtained from the database 33 and a thumbnail file in the contents 31, and provides with the HTML file via the NIC 18 to a browser of the host computer 20.

These programs of control section 30 and DBMS 32, the database 33 and contents 31 are stored in the hard disk 14.

In the hard disk 14, a plurality of folders forming a hierarchical structure are created, and document files, together with respective thumbnail files, arc scored in each folder. A thumbnail file may be a JPEG file, for example, and is a contracted image file or a predetermined page that is representative of each document file, which is a contracted image file of a first page in this embodiment according to the present invention. A path of a document file and, a path of a thumbnail file are corresponding to each other, and thus a name of either one suggests the other. For example, if a path of a document file is /Data/Bin.pdf, a path of its thumbnail file is /Data/Bun_sn-.jpg.

The database 33 includes a file attribution table 330 as exemplarily shown in FIG. 3A, and a saving period table 331 as exemplarily shown in FIG. 3B.

In the saving period table 331, paths and saving periods set for respective folders are stored. The unit of saving period is "day" in this embodiment of the present invention. A saving period set at 0 means no setting (an infinite saving period).

On the other hand, the file attribution table 330 includes fields of a file path including a file name, date and time of the file stored onto the hard disk 14, a data size of the file (MB), a total number of pages of the file, a (scheduled) date of file deletion, and a deleted flag.

A (scheduled) date of file deletion is a saving period added to a registration date of the file, and the saving period is set onto a folder which includes the file. A (scheduled) date of file deletion indicates a scheduled date of file deletion until the saving period has passed, and indicates a date of file deletion after the saving period passed and the file was automatically deleted. A scheduled date of file deletion set at "0", being correspondent to a saving period set at "0", indicates that deletion of the file is not scheduled. A delete flag comes useful in determination of whether a file was stored and has been automatically deleted or a file is originally not stored, because file deletion is automatically performed.

Figure 4:
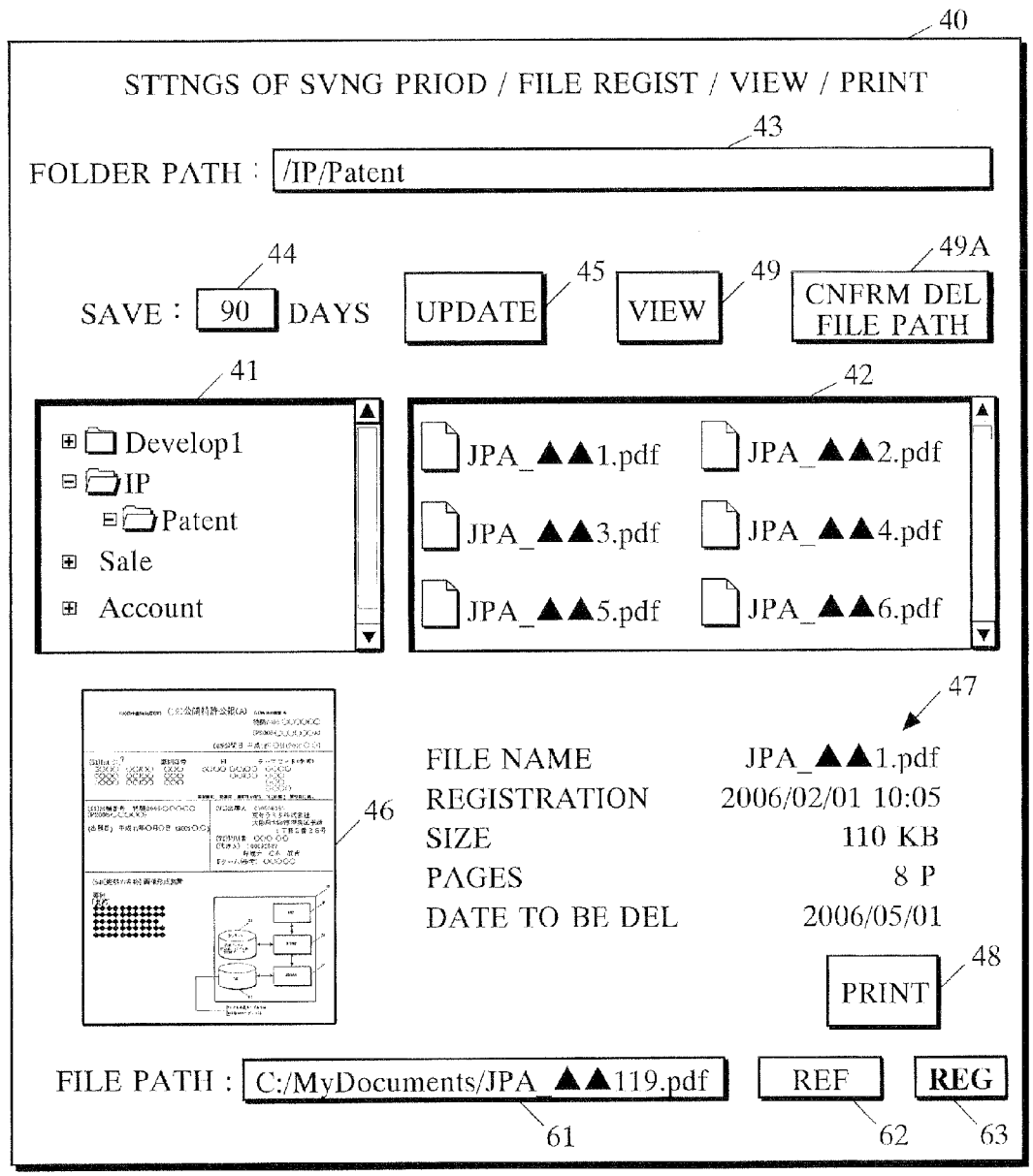
FIG. 4 is an illustration of a remote control panel on a side of a host computer for operating remote image forming apparatus.

FIG. 4 is an illustration of a remote control panel 40 for the image forming apparatus 10, which is displayed by starting a specified application on a side of the host computer 20.

The remote control panel 40 is for setting a file saving period by specifying each folder in the hard disk 14 in the image forming apparatus 10, storing a file on a side of the host computer 20 into a specified folder in the hard disk 14, viewing an attribution and a thumbnail of each document file in a specified folder in the hard disk 14, or printing a selected document file in the hard disk 14.

In a folder view object 41 in the remote control panel 40, folders in the hard disk 14 are displayed in a hierarchical style. By clicking upon a folder in the folder view object 41 with a pointing device 201, the folder is opened and file names inside the folder are displayed on a file view object 42. Each of the folder view object 41 and the file view object 42 is equipped with a scroll bar.

In a text box 43, the path of a folder at a lowest layer opened (selected, in the folder view object 41 is displayed. In a text box 44, the saving period set onto a folder which is specified by this path is displayed. This value is a corresponding value in the saving period table 331.

Figure 5:
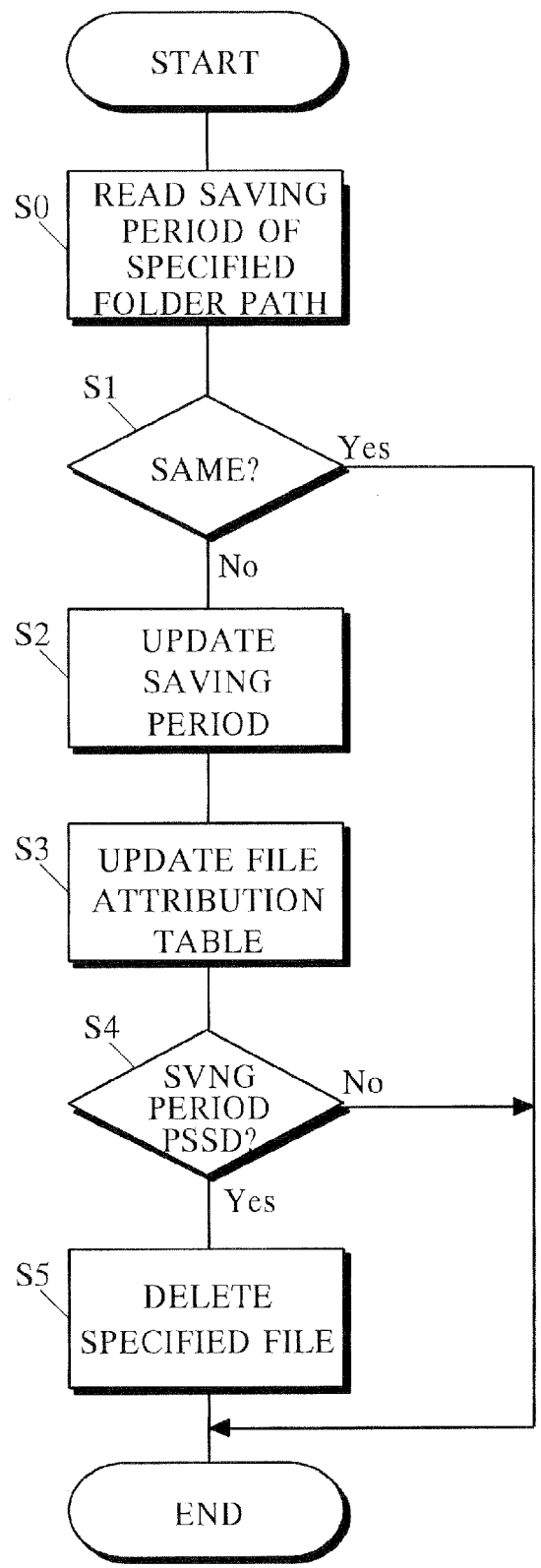
FIG. 5 is a flowchart of saving period updating processing on a folder on a side of an image forming apparatus.

To change saving periods, a user sets the text box 44 as a selected state, operates a keyboard 202 to input a value in the text box 44, and presses an update button 45. By this operation, contents of the text box 43 and 44, together with an update command, are transmitted from the host computer 230 via the NIC 18 to the control section 30. In response to this, the control section 30 performs processing as shown in FIG. 5. In the following description, characters in parenthesis are step identifiers in the drawings.

(S0) The control section 30 opens the saving period table 331 in the database 33 via the DBMS 32, and reads a saving period of a specified folder path.

(S1) The control section 30 ends the processing if this read saving period is identical with the received saving period; otherwise, proceeds to step S2.

(S2) The control section 30 update this saving period in the saving period table 331 with the received value.

(S3) The control section 30 opens a file attribution table 330 in the database 33, and for the files in this folder path, updates each scheduled date of deletion with the saving period added to a registration date.

(S4) The control section 30 proceeds to step S5 if this updated value indicates that its saving period is over; otherwise, ends the processing.

(S5) The control section 30 deletes the file whose saving period is over, and set "deleted" flag of the file in this record in the attribution table 330 to "YES".

Referring back to FIG. 4, when a file name in the file view object 42 is clicked with the pointing device 201, the file name and a folder path displayed in thee text box 43 are provided from the host computer 20 via the NIC 18 in the image Forming apparatus 10 to the control section 30. In response to this, the control section 30 refers to the file attribution table 330 in the database 33 via the DBMS 32, reads a corresponding record and a corresponding thumbnail file in the contents 31, and provides them for the host computer 20 via the NIC 18. Upon this processing, a thumbnail 46 and file attributions 47 of the file are displayed as illustrated in FIG. 4. Since a deleted file cannot be selected in the file view object 42, the file attributions 47 do not include "deleted"; corresponding to this, a "date to be deleted", instead of a "(scheduled) date of file deletion", is included.

Viewing this screen, if a user determines to print the specified file, he presses a print button 48. Upon this, a print setting screen, which is not illustrated in the drawings, is displayed. If a total number of pages is relatively large, the user may change settings of print attributions such as both sides printing or integrated printing, on this screen. If an execute button, which is not illustrated in the drawings, is pressed after the screen is displayed, the command is sent to the control section 30 together wit the print attributions. Responding to this, the control section 30 reads a document file in the contents 31 and executes a print job based on the print attributions.

In order to view attributions of each file in a folder specified in the text box 43, a user presses a view button 49. Here, the remote control panel 40 communicates with a browser of the host computer 20 via a shared memory area. The view button 49 being pressed, contents of the text box 43 and a path of a ASP file, on a side of the image forming apparatus 10, for viewing are provided via the browser and the NIC 18 to the control section 30.

In response to this, according to a program included in the ASP file in the contents 31, the control section 30 accesses the database 33 via the DBMS 32, creates an HTML file by combining data in a folder path specified in the text box 43 with thumbnail files in the contents 31, and provides a browser of the host computer 20 via the NIC 18 with the HTML file.

With this processing, a contents displaying panel 50 as illustrated in FIG. 2 is displayed by a browser of the host computer 20. Next, this contents displaying panel 50 is explained below.

In a text box 51, a folder path in the hard disk 14 of the image forming apparatus 10 is displayed.

In addition, a thumbnail 53 and file attributions 54 respectively corresponding to the thumbnail 46 and the file attributions 47 in FIG. 4 are displayed in a relatively large cell 52 in a table.

Besides, every click on a check box 55 with the pointing device 201 replaces a check mark being displayed (selected) will not being displayed (unselected) and vice versa in turn; in response to this, each check box 550 in the each cell 52 interchange similarly. A check box 550 in the each cell 52 is for a user's selecting and selection clearing in turn individually.

An up/down button 56 and a sort item group 57 are for sorting. In other words, every click on the up/down button 56 reverses a direction of a triangle, interchanging an ascending order and a descending order. In the sort item group 57, a file name 570, a registration date 571, a data size 572, a total number of pages 573 and a scheduled date of deletion 574 are included; clicking each of which with the pointing device 201 provides a folder path written in the text box 51, a selected sort item, and data indicating an ascending order or a descending order corresponding to the up/down button 56, together with a sort command, from a browser of the host computer 20 via the NIC 18 of the image forming apparatus 10 to the control section 30.

Every click on any selected one of the above-mentioned items, a delete button 58, a page designation 59, or a print button 60 with a pointing device 201 provides data corresponding to the clicked object from a browser of the host computer 20 via the NIC 18 of the image forming apparatus 10 to the control section 30, and processing as shown in FIG. 1 is performed in the control section 30.

(S10, S16, S20, S23) If the clicked object is an item in the sort item group 57, the delete button 58, the page designation 59, or the print button 60, the control section 30 determines to be affirmative in steps S1, S16, S20, or S23, respectively, and proceeds to steps S31, S17, S21, or S24, respectively.

(S11 to S13) The control section 30 opens the file attribution table 330 in the database 33 via the DBMS 32, and sorts all the files included in the folder whose path is written in the text box 51 by either a ascending order or a descending order indicated in a state of the up/down button 56, regarding selected items in the sort item group 57.

(S14) The control section 30 creates an HTML file of appropriate page having thumbnails and file attribution data which are arranged in an order of sorted records.

(S15) The control section 30 transmits the HTML file to the browser of the host computer 20 via the NIC 18 and ends the processing of FIG. 1. Thereby, the browser displays the contents display panel 50 having sorted thumbnails and data.

(S17) The control section 30 deletes document files having file names checked in the check box 550, from the contents 31.

(S18) The control section 30 opens the file attribution table 330 in the database 33 via DBMS 32, and deletes records corresponding to the deleted files.

(S19) Regarding undeleted files in this folder, the control section 30 creates an HTML file of appropriate page having thumbnails and file attribution data arranged, and proceeds to step S15.

(S21) The control section 30 obtains records of files corresponding to a specified viewing page among all files in the specified folder, from the file attribution table 330.

(S22) The control section, 30 relates these records with respective thumbnails to ore ate an HTML file, and proceeds to step S15.

(S24) Regarding one or more files having names checked in the check box 550, the control section 30 creates print jobs to print out according to specified print attributions, and execute them.

Referring back to FIG. 4, if a deleted file confirming button 49A is pressed, a folder path in the text box 43, together with a deleted file identifying command, is provided from the host computer 20 via the NIC 18 of the image forming apparatus 10 to the control section 30. Responding to this, the control section 30 opens the file attribution table, finds out records whose "deleted" flag are "Yes" in regard to file paths in this folder path, and transmits these records to the host computer 20 via the NIC 18. In the host computer 20, a window, not shown, is opened to display a list of the records regarding deleted files. A deletion button is displayed on this window, and if this button is pressed, the folder path in the text box 43, together win a record deletion command, is provided from the host computer 20 via the NIC 18 of the image forming apparatus 10 to the control section 30. Responding to this, the control section 30 finds nut the records with "deleted" flag being "Yes" in regard to the folder path in the file attribution table, and deletes these files.

Next, registration of a file on a side of the host computer 20 in a specified folder in the hard disk 14 of the image forming apparatus 10 is explained below.

A path of a file stored in a HDD of the host computer 20 or a removable memory device such as a USB memory coupled to he host computer 20, is written in a text box 61 in FIG. 4. Instead of writing in this way, the path in the text box 61 may be written by pressing a browse button 62 to start a program which displays objects equivalent to the folder view object 41 and the file view object 42 and selecting a file in the folder similarly to selecting a file in the file view object 42.

Figure 6:
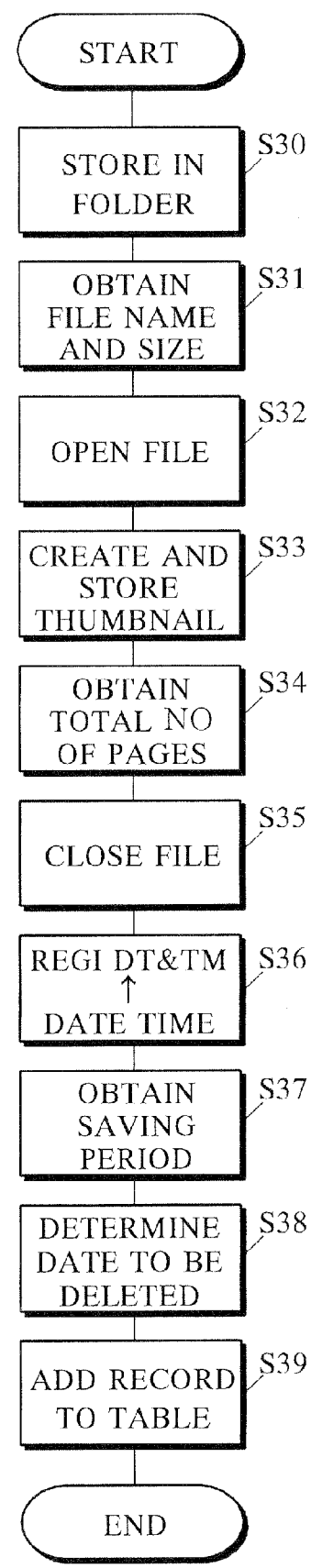
FIG. 6 is a flowchart of processing by a program of storing a file on a host computer into a specified folder on a hard disk in an image forming apparatus.

Pressing a registration button 63 next provides a file path written in the text box 61, a file thereof and a folder path written in the text box 43, together with a registration command, from the host computer 20 to the control section 30 via the NIC 13 of the image forming apparatus 10. Responding to this, the control section 30 performs processing shown in FIG. 6.

(S30) The received file is stored in a folder specified by a path in the text box 43.

(S31) The name and size of this file are obtained.

(S32) This file is opened.

(S33) A contracted image of the first page is created as a thumbnail and stored in the same folder.

(S34) A total number of pages include in this file is obtained from an appropriate position in the file, the position being predetermined according to the extension identifier of the file.

(S35) This file is closed.

(S36) A current date and time is set as a date and time of registration.

(S37) The saving period table 331 is opened to obtain a saving period of the folder mentioned in step S30.

(S38) This saving period is added to the registration date, and a scheduled deletion date of the file is determined.

(S39) The data obtained in steps S31, S34, S36, S37, and S38 are added to the file attribution table 330 as a new record.

File registration onto the hard disk 14 is performed with these steps described above.

Figure 7:
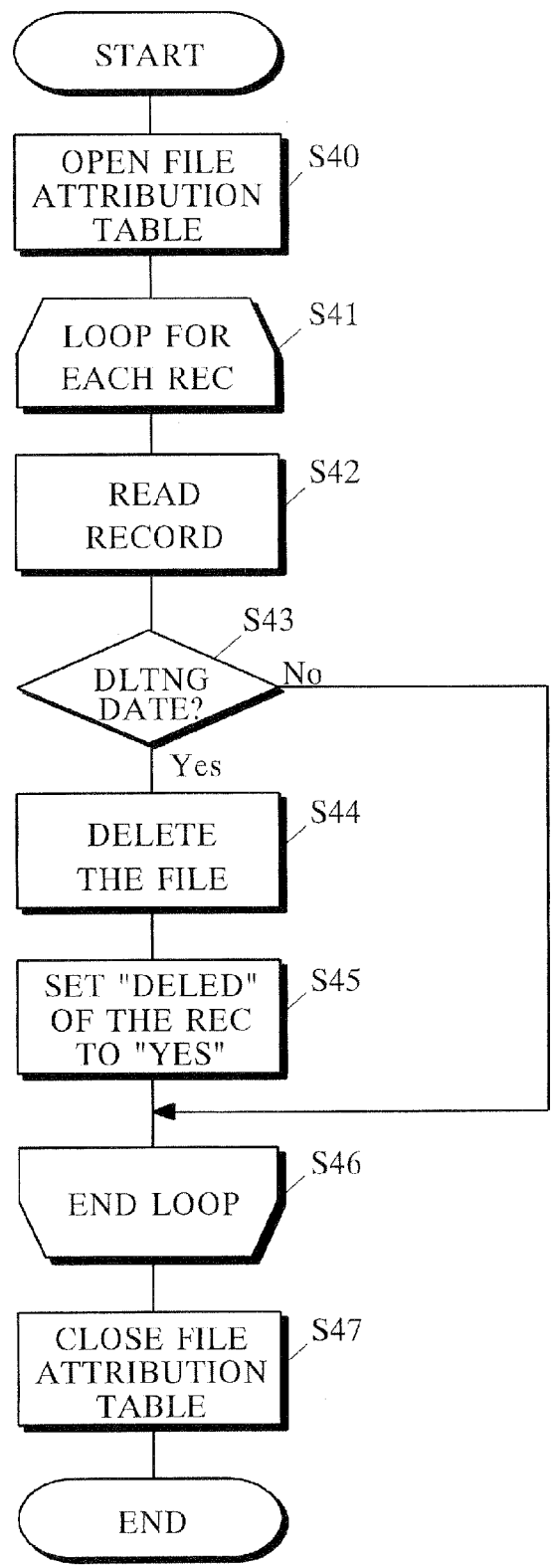
FIG. 7 is a flowchart of processing by an automatic file deletion program.

Next, an automatic file deletion program is explained below. FIG. 7 is a flowchart showing a processing by this program.

This program is performed once a day, at a predetermined time or right after starting up a host computer. Because file registration decreases free spaces in the hard disk 14, the program may be performed at a time of file registration and not more than once a day.

(S40) The file attribution table 330 is opened.

(S41) For each record in this table, the following steps S42 to S45 are executed.

(S42) A record is read.

(S43) if a "scheduled date of deletion" of his record is a current day, the process goes to step S44; otherwise, goes to step S46.

(S44) A file identified by a "file path" of this record is deleted.

(S45) A delete flag of this record is set to "Yes".

(S43) If this processing is not completed for all the records, moving to a next record is performed and the process goes back to step S42.

(S47) The file attribution table 330 is closed.

This embodiment according to the present invention has an advantage in that a user can readily and quickly confirm and delete unnecessary files, even if many unnecessary files are stored in the HDD 14, since the following structure is adopted.

That is, in response to receipt of a document file, a folder path, and a file registration request through the NIC 18, a path of the document file and a date of the file reiteration to the HDD 14 are related and written in the file attribution table 330. Then this document file is stored into the folder in the HDD 14, and a thumbnail of a first page of the document file is created and stored in the HDD 14.

Besides, in response to a view request through the NIC 18, (a) a file path and a registration date of the file included in a record of the file attribution table 330 are related with a thumbnail to create an HTML file, which is next transmitted to the host computer 20;

records in the file attribution table 330 are sorted in response to receipt of a sort request through the NIC 18, a sort item corresponding to any field in the file attribution table 330, and data indicating either a ascending order or a descending order;

next the processing (a) is executed;

in response to receipt of a file deletion request and a file path as identifying data of a deletion file through the NIC 18, a document file identified by this file path is deleted from the HDD 14, and a record corresponding to the file path is deleted from the file attribution table 330; and the processing a) is executed.

In addition, since a total number of pages of contents of a document file is also related with a file path and stored in the file attribution able 330, a total number of pages is displayed together with a thumbnail when viewing a file; therefore, there is an advantage in that a user can take a total number of pages into account and perform a double sided printing or an integrated printing with contraction.

Besides, since a data size of a document file is also related with a file path and stored in the file attribution table 330, a data size is displayed together with a thumbnail when viewing a file; therefore, there is an advantage in that a user can take a data size into account and effectively manage files especially when free spaces in the HDD 14 become small.

Moreover, by sorting with selective manipulation of any of the up/down button 56 and sort items 570 to 574 on the panel 50 and manipulation of the check boxes 55 and 550, there is an advantage in that file deletion is readily performed.

Furthermore, there is an advantage in that a user can readily and quickly delete document files stored in the HDD 14 of the image forming apparatus 10 while confirming each of them by using an existing browser stored in the host computer 20 connected to the image forming apparatus 10.

Although a preferred embodiment of the present invention have been described, it is to be understood that the invention is not limited thereto and that various changes and modifications may be made without departing from the spirit and scone of the invention.

For example, a saving period of a subdirectory may be assumed to be identical with that of a parent directory. In this structure, it is possible to create folders having different saving periods to each other and then inside each folder, create a plurality of subfolders of various types.

In addition, although a structure wherein, when string a file onto a hard disk of an image forming apparatus, a thumbnail of a specified page of the file is created and a file attribution is written in the file attribution table 330 (S31 to S39), has been described in the embodiment according to the present invention above, these processes may be performed when creating a view screen of FIG. 2. With this structure, the present invention is applicable to existing devices wherein files are already stored.

Besides, instead of making a (scheduled) date of file deletion in the file attribution table 330, a scheduled date of file deletion may be counted when needed with referring to the saving period table 331.

Moreover, although a structure where the contents display panel 50 is displayed by a browser on the side of the host computer 20 has been described in the embodiment above, the display panel 50 may be displayed on a side of the host computer 20 by using a dedicated application.

Furthermore, the remote control pane 40 may be split in, for example, two screens, in order to make narrow and displayed on the control panel 19 of the image forming apparatus 10.

Furthermore, the file view program, in response to receipt of a request through the communication interface from a host computer, may order the MPU 11 to transmit a deletion file selecting script program and a file deletion demanding script program which are interpreted and executed through a browser of the host computer 20, wherein the deletion file selecting script program orders a processor of the host computer 20 through the browser: in response to receipt of an input of deletion file selection, to relate a mark indicating a deletion file to the name thereof and to display the mark on a window of the browser, wherein the file deletion demanding script program orders the processor of the host computer 20 through the browser: in response to receipt of a file deletion instruction, to transmit the file deletion instruction and data having the file name corresponding to the mark to the NIC 18.

In addition, for example, a DVD (digital video disc) and its recording and playback equipment or a USB (universal serial bus) memory may be used instead of the HDD 14.

What is claimed is:

1. An image forming apparatus comprising:

a processor;

program storing means, coupled to the processor, for storing programs;

an auxiliary storage, coupled to the processor, for storing data files for printing, a file attribution table having fields of a file path, a registration date of the file, a deletion date of the file, and a delete flag, and a saving period table having fields of a folder path and a saving period;

control panel means, coupled to the processor, having display means and inputting means; and a communication interface coupled to the processor;

wherein the programs comprises a file registration program, a file view program, and an automatic file deletion program, wherein the file registration program orders the processor:

in response to receipt of a file registration instruction, a file, and a folder path through the communication interface, to add a record having a path of the file, a current date as a registration date of the file, a current date plus saving period of the corresponding record on the saving period table as the deletion date of the file, and a delete flag of a value indicating that the file has not been deleted to the file attribution table, to store the file into the folder of the auxiliary storage, and to create a thumbnail of a specified page of the file to store the thumbnail into the auxiliary storage, wherein the file view program orders the processor:

in response to receipt of a view instruction from the inputting means or the communication interface, (a) to create a display data having file names, and registration dates, and deletion dates of respective records having a delete flag value indicating not having been deleted on in the file attribution table with respective thumbnails, and to provide the display data to the display means or through the communication interface to a host computer; and in response to receipt of a sort instruction and data indicating a sort item on the file attribution table and indicating either an ascending or descending order from the inputting means or through the communication interface, to sort records on the file attribution table, and to execute the processing of (a); and wherein the automatic file deletion program orders the processor to delete each file whose deletion date of corresponding record on the file attribution table is equal to a current date, and to change the value of the delete flag at this record into a value indicating having been deleted while keeping the corresponding file path in the file attribution table.

2. The image forming apparatus according to claim 1 wherein the record added to the file attribution table further includes a total number of pages of contents in a data file for printing, wherein the display data further has the total number of pages.

3. An image forming apparatus according to claim 1 wherein the record added to the file attribution table further includes a data size of a data file for printing, wherein the display data further has the total number of pages.

4. An image forming apparatus according to claim 1 wherein the file view program further orders the processor:

in response to an input of a deletion file selection from the inputting means or through the communication interface, to add data of a mark indicating a deletion file and a file name thereof to the display data.

5. An image forming apparatus according to claim 1 wherein the file view program, in response to receipt of a request through the communication interface from a host computer, orders the processor to transmit a deletion file selecting script program and a file deletion demanding script program which are interpreted and executed through a browser of the host computer, wherein the deletion file selecting script program orders a processor of the host computer through the browser:

in response to receipt of an input of deletion file selection, to relate a mark indicating a deletion file to the name thereof and to display the mark on a window of the browser, wherein the file deletion demanding script program orders the processor of the host computer through the browser:

in response to receipt of a file deletion instruction, to transmit the file deletion instruction and data having the file name corresponding to the mark to the communication interface.

6. An image forming apparatus comprising:

a processor;

storing means, coupled to the processor, for storing programs and data, the programs having a saving period setting program, a file registration program, and an automatic file deletion program, the data having a saving period table and a file attribution table; and a communication interface coupled to the processor;

wherein the saving period setting program orders the processor:

in response to receipt of a saving period registration instruction, a folder path, and a saving period through the communication interface, to add a record having the folder path and the saving period to the saving period table, wherein the file registration program orders the processor:

in response to receipt of a file registration instruction, a file, and a folder path through the communication interface, to add to the file attribution table a record having a path of the file, a registration date of the file, the registration date plus the saving period of the corresponding record on the saving period table as a deletion date of the file, and a delete flag of a value indicating not having been deleted, and to store the file into the folder, wherein the automatic file deletion program orders the processor to delete each file whose deletion date of corresponding record on the file attribution table is equal to a current date, and to change the value of the delete flag at this record into a value indicating having been deleted while keeping the corresponding file path in the file attribution table.

7. The image forming apparatus according to claim 6 wherein the programs further have an information processing program for deleting flags which orders the processor to:

in response to receipt of a deleted file confirming instruction with a folder path through the communication interface, to find out records each of which has a delete flag indicating having been deleted, and to send back contents of the records; and in response to receipt of a deleted instruction with a folder path through the communication interface, to delete records each of which has a delete flag indicating having been deleted and has the folder path.

8. The image forming apparatus according to claim 7 wherein the programs further have a view processing program which orders the processor to:

in response to receipt of a sort instruction with a folder path and a sort item which is equal to one of the fields on the file attribution table, and an order indicating either an ascending or descending through the communication interface, to sort records on the file attribution table in accordance with the sort instruction, and to send back contents of the sorted records.

9. The image forming apparatus according to claim 6 wherein the programs further have a view processing program which orders the processor to:

in response to receipt of a sort instruction with a folder path and a sort item which is equal to one of the fields on the file attribution table, and an order indicating either an ascending or descending through the communication interface, to sort records on the file attribution table in accordance with the sort instruction, and to send back contents of the sorted records.

* * * * *